(12) United States Patent
Klemm et al.

(10) Patent No.: US 11,526,540 B2
(45) Date of Patent: *Dec. 13, 2022

(54) SYSTEMS AND METHODS FOR COMPILING AND DYNAMICALLY UPDATING A COLLECTION OF FREQUENTLY ASKED QUESTIONS

(71) Applicant: Avaya, Inc., Santa Clara, CA (US)

(72) Inventors: Reinhard Klemm, Basking Ridge, NJ (US); Valentine C. Matula, Granview, OH (US); David Skiba, Golden, CO (US)

(73) Assignee: Avaya Inc., Santa Clara, CA (US)

( * ) Notice: Subject to any disclaimer, the term of this patent is extended or adjusted under 35 U.S.C. 154(b) by 160 days.

This patent is subject to a terminal disclaimer.

(21) Appl. No.: 16/820,268

(22) Filed: Mar. 16, 2020

(65) Prior Publication Data
US 2020/0218747 A1   Jul. 9, 2020

Related U.S. Application Data

(63) Continuation of application No. 14/672,478, filed on Mar. 30, 2015, now Pat. No. 10,621,218.

(51) Int. Cl.
*G06F 16/332* (2019.01)
*G06F 16/35* (2019.01)

(52) U.S. Cl.
CPC ........ *G06F 16/3329* (2019.01); *G06F 16/355* (2019.01)

(58) Field of Classification Search
None
See application file for complete search history.

(56) References Cited

U.S. PATENT DOCUMENTS

| 2004/0165705 | A1* | 8/2004 | Cragun | G06F 16/95 |
| 2008/0104065 | A1* | 5/2008 | Agarwal | G06F 16/3329 |
| 2013/0024457 | A1* | 1/2013 | Chua | G06F 16/30 707/740 |
| 2013/0297625 | A1* | 11/2013 | Bierner | G06F 16/33 707/754 |
| 2014/0172883 | A1* | 6/2014 | Clark | G06F 16/334 707/749 |
| 2014/0337257 | A1* | 11/2014 | Chatterjee | G06F 16/35 |
| 2015/0178267 | A1* | 6/2015 | Heo | G06F 16/3344 707/722 |

(Continued)

*Primary Examiner* — Son T Hoang

(57) ABSTRACT

At least one social media channel includes a plurality of user messages, which are accessible via a communication network. At least some of the stored messages are retrieved from the at least one social media channel via the communication network, and a collection of frequently asked questions (FAQ) is generated or updated by analyzing the retrieved messages to form a plurality of topical issue clusters. Each topical issue cluster is associated with at least one topic parameter from among a plurality of topic parameters, each topic parameter relates to at least one of use, installation or maintenance of a product or service, and each topical issue cluster includes at least one issue identified by a community of users and at least one resolution of the issue identified by the community of users. The generated or updated FAQ is uploaded to a storage location accessible to the community of users.

20 Claims, 7 Drawing Sheets

(56) References Cited

U.S. PATENT DOCUMENTS

| | | | |
|---|---|---|---|
| 2016/0196334 A1* | 7/2016 | Bastide | G06F 16/3344 |
| | | | 707/776 |
| 2016/0196561 A1* | 7/2016 | Iyer | G06F 16/33 |
| 2016/0203225 A1* | 7/2016 | Alonso | G06F 16/335 |
| | | | 707/738 |
| 2016/0246885 A1* | 8/2016 | Aravamudhan | G06F 16/9535 |
| 2016/0283948 A1* | 9/2016 | Snapir | G06F 16/24575 |

\* cited by examiner

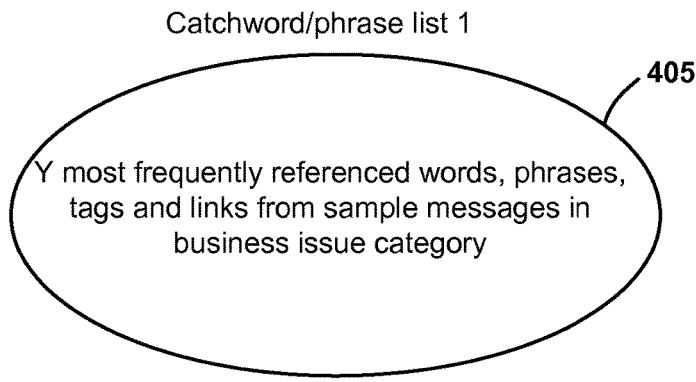
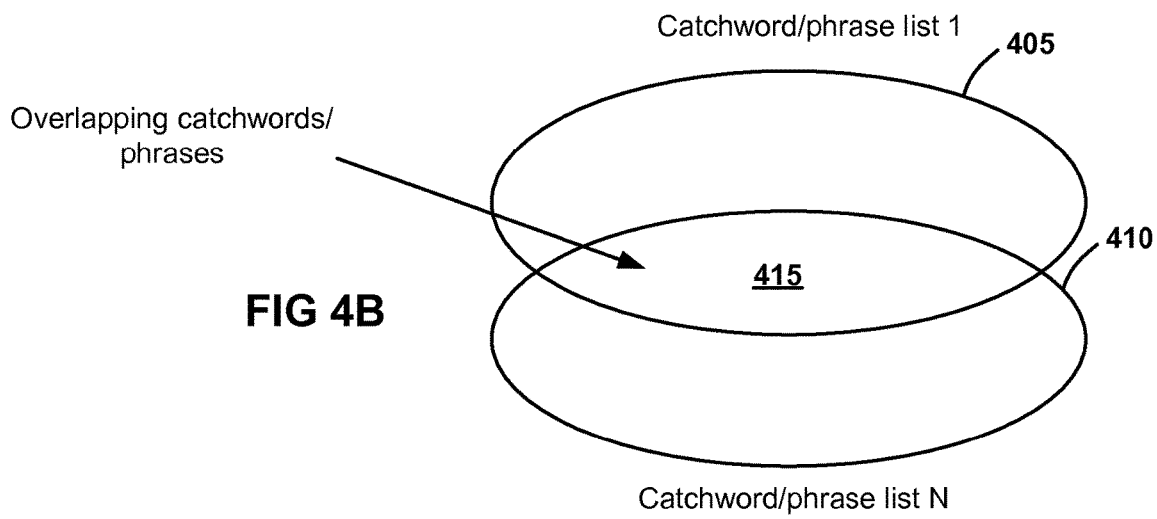
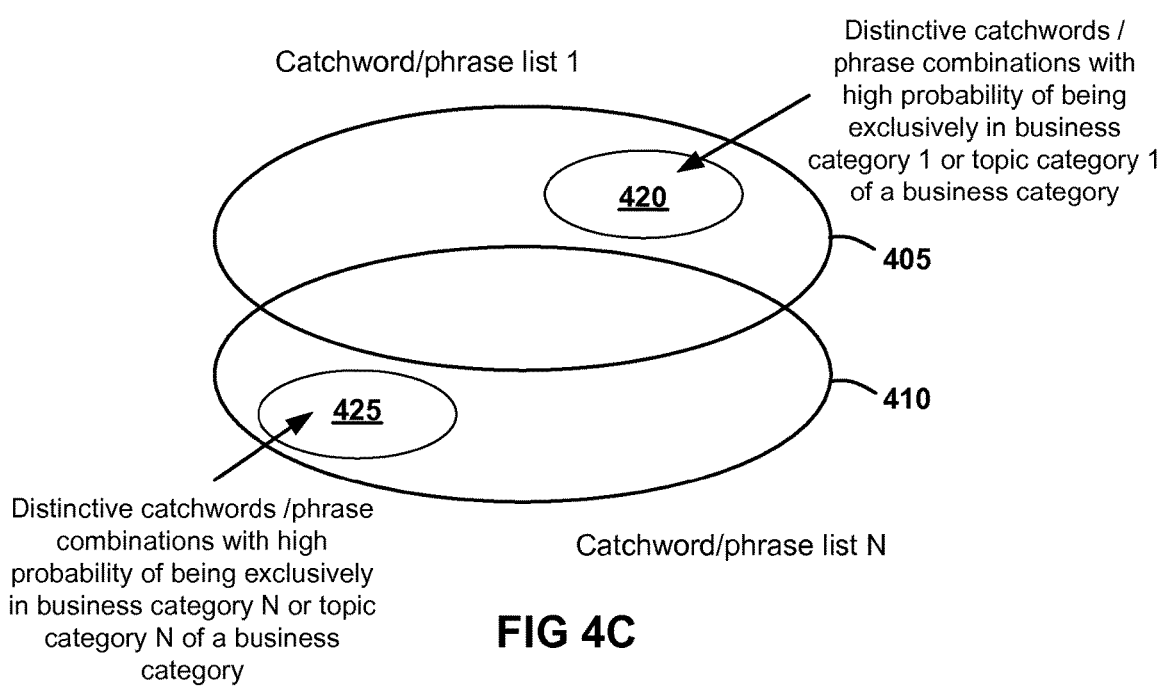

SYSTEMS AND METHODS FOR COMPILING AND DYNAMICALLY UPDATING A COLLECTION OF FREQUENTLY ASKED QUESTIONS

RELATED APPLICATIONS

This application is a continuation of U.S. patent application Ser. No. 14/672,478, entitled "SYSTEMS AND METHODS FOR COMPILING AND DYNAMICALLY UPDATING A COLLECTION OF FREQUENTLY ASKED QUESTIONS," filed Mar. 30, 2015, which is hereby incorporated by reference in its entirety.

BACKGROUND OF THE INVENTION

1. Field of the Invention

Embodiments of the present invention generally relate to customer relationship management and, more particularly, to systems and methods for the timely delivery of information and support to customers of a business entity.

2. Description of the Related Art

It is now commonplace for businesses and other entities to have a presence on one or more public social networks, each a "social media channel". These social media channels may take the form, for example, of a Facebook page, a Twitter feed, or a LinkedIn feed. Increasingly, customers and prospective customers are using social network channels to post status inquiries, to make complaints, and to request information about a product or service. The same enterprise may also maintain a contact center and/or web portal for individuals seeking to consummate a purchase transaction, to make customer service queries, and/or to obtain assistance with selecting, installing, configuring or using a particular product.

Many customers of a business have similar, recurring questions for the business' contact center, staff, salespeople or other business representatives. New questions arise any time the business launches a new product or service, announces plans for such a launch, or changes existing products and services. External events impacting the business products and services can also prompt a set of new and then recurring questions from customers. These questions can tie up subject matter experts and/or the contact center agents that are called upon to provide answers to these questions. In the era of social networking, product complaints and issues uncovered by one person may spread like "wildfire" among a community of users and customers, with the marketplace now favoring those enterprises who are able to quickly react to such issues and address them forcefully and systematically.

To offer assistance to the visitors with queries or concerns, businesses typically host or sponsor a website having a 'Frequently Asked Questions' (FAQs) section, or a navigable link to such a FAQ section. However, updating such a FAQ has heretofore required the assignment of personnel to the task of manually distilling common customer concerns and questions from, for example, a large body of records about customer inquiries. Due to the effort required, businesses update their FAQs rarely and, even then, only after some new obvious common customer issue or concern has been discovered. A relatively static FAQ, however, may not adequately address the need to quickly identify and respond to the issues of greatest concern to a community of users or customers, nor the need to construct and deliver an appropriate response so as to minimize any impact on an enterprise's online and social representation and enhance that enterprise's reputation. Moreover, since business personnel filters, compiles, prioritizes, and presents the FAQ items, the user community who is supposed to benefit from the FAQ is left out of the authoring process, thus decreasing the effectiveness of the FAQ.

A need therefore exists for systems and techniques which enable an enterprise to dynamically identify questions as they emerge within a community of users, and to automate, to the extent practicable, the process of constructing and disseminating responses to those questions. These systems and techniques need to allow the user community to actively influence the filtering, prioritizing, presentation, content creation, and dynamic management of questions and answers.

SUMMARY OF THE INVENTION

The Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Systems and methods are described for dynamically identifying questions, issues or concerns—as they emerge and/or reach a significant threshold of frequency or intensity—within a community of users of an enterprise's products and/or services, and for at least partially automating the process of constructing and disseminating appropriate responses.

In an embodiment, a computer implemented method for compiling and dynamically updating a collection of frequently asked questions (FAQ) comprises (i) receiving a selection of at least one social media channel, wherein each social media channel includes a plurality of messages originated by a community of users and stored on a server, and wherein the plurality of messages being accessible via a communication network; (ii) retrieving at least some of the stored messages from the at least one social media channel via the communication network; (iii) at least one of generating or updating, by a processor, a collection of frequently asked questions (FAQ) by analyzing the retrieved messages to form a plurality of topical issue clusters, wherein each topical issue cluster is associated with at least one topic parameter from among a plurality of topic parameters, wherein each topic parameter relates to at least one of use, installation or maintenance of a product or service, and wherein each topical issue cluster includes at least one issue identified by the community of users and at least one resolution of the issue identified by the community of users; and (iv) transmitting the generated or updated FAQ to a storage location accessible to the community of users.

According to yet another embodiment, a system for compiling and dynamically updating a collection of frequently asked questions (FAQ) comprises at least one processor; and a memory having stored therein machine executable instructions, that when executed by the at least one processor, cause the apparatus to: (i) receive a selection of at least one social media channel, wherein each social media channel includes a plurality of messages originated by a community of users and stored on a server, and wherein the plurality of messages being accessible via a communication network; (ii) retrieve at least some of the stored messages from the at least one social media channel via the communication network; (iii) at least one of generate or update a collection of frequently asked questions (FAQ) by analyzing the retrieved messages to form a plurality of topical issue clusters, wherein each topical issue cluster is associated with at least one topic parameter from among a plurality of topic parameters, wherein each topic parameter relates to at least one of use, installation or maintenance of a product or service, and wherein each topical issue cluster includes at least one issue identified by the community of users and at least one resolution of the issue identified by the community of users; and (iv) transmit the generated or updated FAQ to a storage location accessible to the community of users.

BRIEF DESCRIPTION OF THE DRAWINGS

FIG. 4A is a graphical representation of boundaries of a catchword/catchphrase list having Y most referenced words from sample messages in a business issue (e.g. product issue) category;

FIG. 4B is a graphical representation showing how catchword lists may overlap so that membership in a catchword list is not unique;

FIG. 4C is a graphical representation of boundaries of distinctive catchwords (and/or distinctive catchword combinations and/or phrases) to classify new messages into existing or newly created topical issue clusters;

Figure 1A:
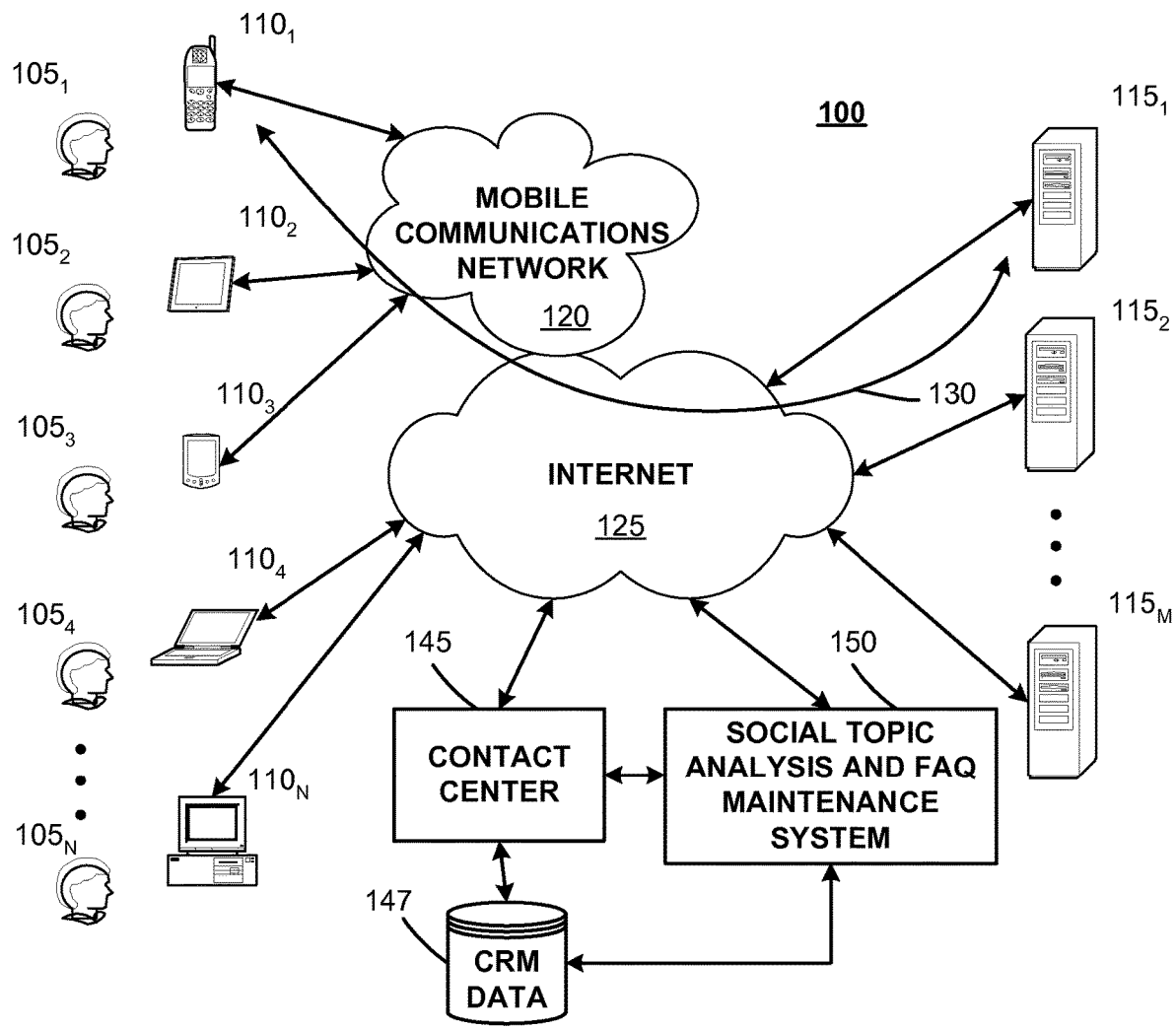
FIG. 1A is a block diagram depicting a communication system for compiling and dynamically updating a collection of frequently asked questions (FAQ) based on monitoring of one or more social network channels, according to one or more embodiments.

While the method and apparatus is described herein by way of example for several embodiments and illustrative drawings, those skilled in the art will recognize that the method and apparatus for compiling and dynamically updating a collection of frequently asked questions (FAQ) is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for compiling and dynamically updating a collection of frequently asked questions (FAQ).

Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Embodiments of systems and techniques for compiling and dynamically updating a collection of frequently asked questions (FAQ) consistent with the present disclosure are based on the analysis of social media messaging activity by a community of users. In some embodiments, a contact center, or other system for responding to customers via social network channel(s), is configured so as to provide responses to user comments and concerns.

In many contact centers, agents are expected to communicate with customers via voice channels, via instant messaging channels and, increasingly, via the use of social networking channels (e.g., posts to a Facebook or Twitter page maintained by the entity which the agents represent. There is a universal customer expectation, on the part of those customers relying upon a voice channel, that a connection will be made to an agent in a few minutes or less. To some extent, this is also true of instant messaging channels, as the very term "instant" implies (though the degree to which the customer may continue to work on other matters and even conduct a phone calls in the course of his or her business can give rise to a more protracted interaction between agent and customer).

Certain issues, concerns, and/or problems (collectively, "topics") are so frequently raised by members of a community of interest to a provider of products and services (e.g., customers, potential customers, product installers, etc), that substantial efficiencies would be realized if they could be addressed in a prompt and centralized manner. Methods and systems achieve such efficiencies, in accordance with one or more embodiments, through an automated process for not only identifying the socially topical issues as they emerge within a user community, but also for facilitating the dissemination of appropriate resolutions to the issues, problems and/or questions presented by those topics.

In accordance with embodiments of the present disclosure, one or more social networks sponsored and/or identified by a supplier of products and/or services become a mechanism for collecting the various data from a community of users needed to identify a set of topics and topical issue clusters. To this end, a system according to one embodiment automatically and continuously retrieves topical issue message posts as well as responses to those posts. Typically, a topical issue messages is posted to a social media channel (e.g., a Facebook page, Twitter feed, and/or a hosted web site "forum") by a member of the community of social media channel users who have used, or expect to use, a product or service offered by an entity such as a commercial enterprise.

One or more other users may ratify an experience of the initial user ("originator of the topical issue") in the form of a reply or by independently posting a message having equivalent content and, in either case, be counted as raising the same topic. Conversely, one or more other users, or a representative of the entity, may respond to the initial and/or a subsequent user raising a topic by posting a reply which proposes a resolution to the issue, problem or question raised by the topic. For each topic, a topical issue cluster is generated by selecting a representative social media channel message identifying an issue, problem or question and a social media channel message representative of a response to the topic.

In embodiments, those topical issue clusters corresponding to a topic having the highest statistical frequency of being raised by users, or exceeding a certain frequency threshold selected by an administrator, are automatically included in the FAQ. In some embodiments, the phraseology of the topic statement and/or response is obtained using the phraseology of the representative messages, and these representative messages are selected automatically based on positive feedback such as a number of "likes" or other mechanism for expressing user sentiment. Similarly, a message included in a topical issue cluster may be excluded on the basis of negative feedback such, for example, as a number of "dislikes".

In some embodiments, the user community is provided with an ability to "crowd-edit" the content of pre-existing FAQ items, both in a question component and in an answer component of the FAQ item(s). This crowd-editing aspect leads to an improvement of the quality and responsiveness of the FAQ item(s).

Various embodiments of a method and apparatus for compiling and dynamically updating a collection of frequently asked questions (FAQ) are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Reference will now be made in detail to exemplary embodiments of the present invention, examples of which are illustrated in the accompanying drawings. Wherever possible, the same reference numbers will be used throughout the drawings to refer to the same or like parts.

FIG. 1A is a block diagram depicting a system 100 that facilitates detection of, analysis of, and response to—by one or more entities such, for example, as a for-profit enterprise offering products and/or services—the issues, problems, questions, and/or concerns (collectively, "socially topical issues" or, alternatively, "topics") raised, discussed and/or resolved by (a) one or more customers, (b) potential customers, and (c) those individuals having an influence over customers and/or potential customers. To that end, embodiments of system 100 are configured, inter alia, to monitor one or more pre-configured social media channels in order to "crowd-source" at least one of (a) the identification of one or more topics of emerging or continuing interest on the part of a community of users and relevant to the activities of an entity so that the entity may construct and disseminate an appropriate and timely response or (b) both the identification of and the response to such topic(s).

In some embodiments, a collection of query response sets resulting from the aforementioned crowd-sourcing forms the basis of a set of frequently asked questions "published to the community of users via the same monitored social media channel(s) as were used to perform the crowd-sourcing.

With continuing reference to FIG. 1A, there is shown a communications network environment that facilitates access to one or more social media channel(s) by users 105.sub.1, 2 . . . N of communication terminal equipment 110.sub.1, 2 . . . N and with which the present arrangement for semi-automated crowd-sourcing of topics and/or applicable responses may be implemented. In this example, the social media channel(s) are one or more landing pages, user profiles, "white boards" or other location on a social networking site (e.g., "Facebook" or "LinkedIN") as site 115.sub.1, a public message forum hosted at a web server as site 115.sub.2, or a public message feed 115.sub.N such, for example, as. "Twitter"). Some or all of the social media channels may be sponsored and/or maintained by the entity, though in some embodiments, they may be on behalf of the entity, or even by a third party serving in a "community interest" capacity as, for example, a clearinghouse for information relating to a number of competitors product(s) and/or service(s).

Access to the social media channels is implemented, for users 105.sub.1, 105.sub.2 and 105.sub.3 of mobile devices 110.sub.1, 110.sub.2 and 110.sub.3, respectively, by a mobile communications network 120 that is operatively connected to the social media channels 115 via the Internet 125. However, the present system and method are necessarily limited in applicability to mobile communications network implementations and in the illustrative example of FIG. 1A, users 105.sub.4 and 105.sub.N are depicted as being users of other communication terminal device types such as laptop computer 110.sub.4 and desktop computer 110.sub.N which each access the World Wide Web via one or more local area and wide area networks, PSTNs (Public Switched Telephone Networks), and the like. Devices such as terminals 110.sub.1 to 110.sub.3 may likewise be capable of preferentially utilizing a local and/or wide area network so that system 100 may incorporate both wired and wireless infrastructure may be utilized in some implementations.

In this illustrative example, the mobile communications network 120 may be arranged using one of a variety of alternative networking standards such as GPRS (General Packet Radio Service), UMTS (Universal Mobile Telecommunications System), GSM/EDGE (Global System for Mobile Communications/Enhanced Data rates for GSM Evolution), CDMA (Code Division Multiple Access), CDMA2000, or other 2.5G, 3G, 3G+, or 4G (2.5.sup.th generation, 3.sup.rd generation, 3.sup.rd generation plus, and 4.sup.th generation, respectively) wireless standards, and the like.

The communication terminals 110 may include any of a variety of conventional electronic devices or information appliances that may, but need not be, portable and battery-operated and which may facilitate communications using voice and data. For example, the mobile terminals 110.sub.1 to 110.sub.3 can include mobile phones (e.g., non-smart phones having a minimum of 2.5G capability), e-mail appliances, smart phones, PDAs (personal digital assistants), ultra-mobile PCs (personal computers), tablet devices, tablet PCs, handheld game devices, digital media players, digital cameras including still and video cameras, GPS (global positioning system) navigation devices, pagers, electronic devices that are tethered or otherwise coupled to a network access device (e.g., wireless data card, dongle, modem, or other device having similar functionality to provide wireless Internet access to the electronic device) or devices which combine one or more of the features of such devices. Typically, the mobile terminals as terminals 110.sub.1 to 110.sub.3 will include various capabilities such as the provisioning of a user interface that enables a user 105 to access the Internet 125 and browse and selectively interact with social networking sites and web forums that are served by the servers 115, as representatively indicated by reference numeral 130.

The network environment of system 100 may also operation of a contact center 145 which operates in conjunction with a customer relation management database 147 among machine-to-machine (M2M) equipment and facilitate the utilization of various M2M applications. In this case, various instances of peer M2M equipment as contact center 145 and social topic analysis and FAQ maintenance system 150 or other infrastructure supporting one or more M2M applications will send and receive traffic over the Internet 125. Such activity facilitates access to the social channel posts and messaging activity of the community of users, as users 105.sub.1 to 105.sub.N in order to identify one or more topics and, in embodiments, identify or initiate generation of responses to those topic(s) and then organize them in a semi-automated manner.

Figure 1B:
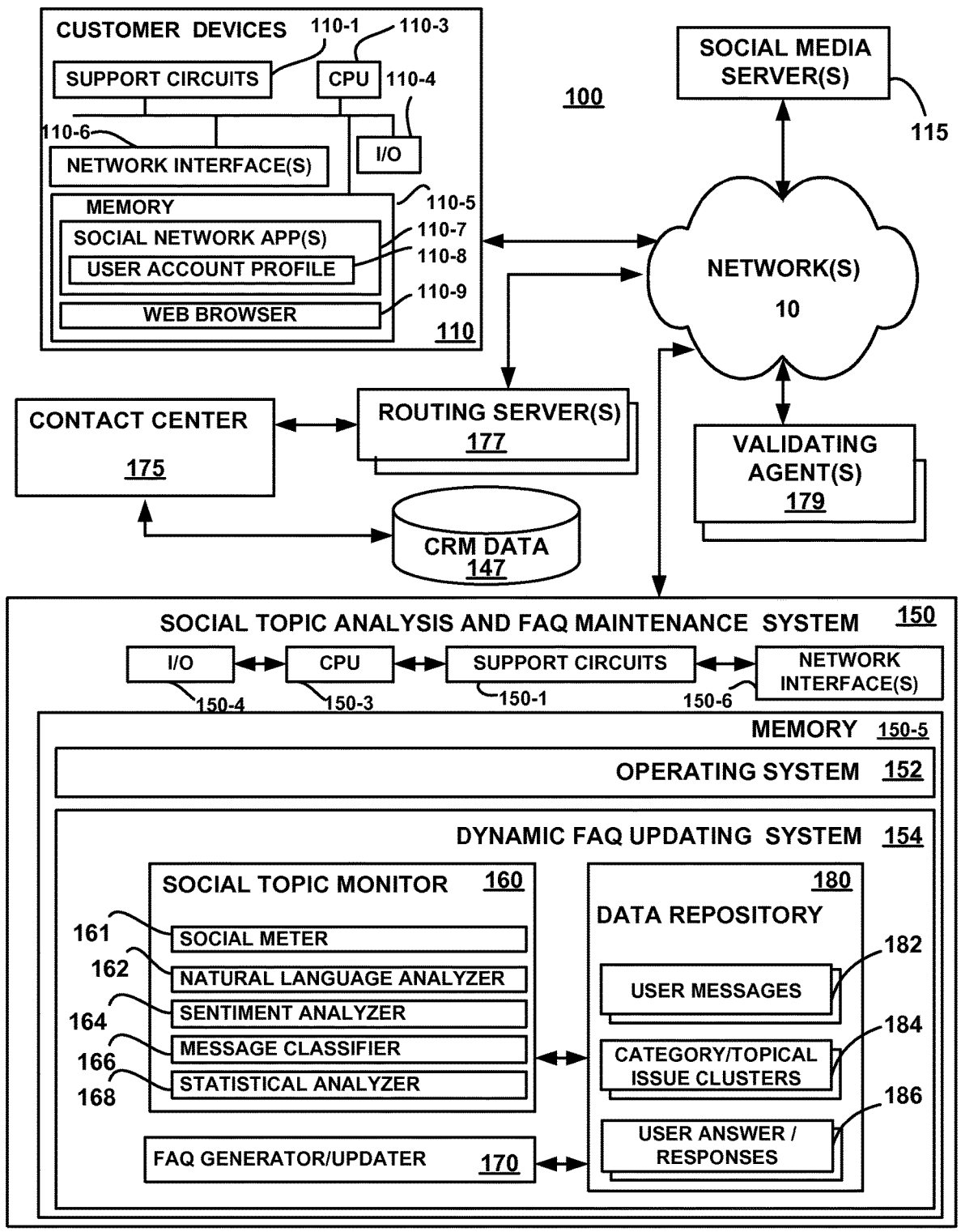
FIG. 1B is a block diagram depicting, in greater detail, the system of FIG. 1A configured to compile and dynamically updating a collection of frequently asked questions (FAQ) based on monitoring of one or more social network channels, according to one or more embodiments.

FIG. 1B is a block diagram depicting, in greater detail, the system 100 of FIG. 1A configured to compile and dynamically updating a FAQ by monitoring one or more social network channels, according to one or more embodiments. System 100 includes a social topic analysis and FAQ maintenance system ("server") 150, user (or customer) devices 110, one or more social networking site servers, collectively referred to as social media server(s) 115, one or more contact center(s) 175, and one or more routing server(s) 177.

The system 150 is a computing device, for example a desktop computer, laptop, tablet computer, and the like or a cloud based server e.g., a blade server, virtual machine, and the like. The system 150 includes one or more Central Processing Units (CPUs) as CPU 150-3, support circuits 150-1, input/output circuits 150-4, network interfaces 150-6, and a memory 150-5. The CPU 150-3 may include one or more commercially available microprocessors or microcontrollers that facilitate data processing and storage. The various support circuits 150-1 facilitate the operation of the CPU(s) 150-3 and include one or more clock circuits, power supplies, cache, input/output circuits, and the like. The memory 150-5 includes at least one of Read Only Memory (ROM), Random Access Memory (RAM), disk drive storage, optical storage, removable storage and/or the like.

The memory 150-4 includes an operating system 152, and a Dynamic FAQ Updating module (DFU) 154. The operating system 152 may include various commercially known operating systems. DFU module 154 comprises a social topic monitor 160, a FAQ generator/updater 170 and a data repository 180. Social topic monitor 160 includes a social meter 161 configured to access and retrieve messages from one or more pre-identified social media channels. A social meter suitable for carrying out these and other functions of social topic monitor 160 is described in U.S. Patent Application Publication No. US20140250182, owned by the Assignee herein and entitled SYSTEM AND METHOD FOR DETECTING AND ANALYZING USER MIGRATION IN PUBLIC SOCIAL NETWORKS, the disclosure of which is expressly incorporated herein by reference in its entirety.

With continuing reference to FIG. 1B, it will be seen that in addition to social meter 161, the social topic monitor 160 further includes a natural language analyzer 162, a sentiment analyzer 164, a message content classifier 166, and a statistical analyzer 168. The data repository 180 of DFU module 154 contains raw user messages 182, topical issue clusters or sets 184 as organized by content classifier 166, and user issue/response sets 186 selected for inclusion in one or more FAQs according to statistical analysis by statistical analyzer 168 and, optionally, according to sentiment analysis by sentiment analyzer 164.

According to some embodiments, data repository 180 also includes a messaging activity record for each stored message, the activity record including the date and time of a message transaction, the content of the corresponding message, the author of the message as, for example, a subscriber handle, and the identity of the media channel site (e.g., Facebook page, Twitter feed, or URL) from which the message was extracted. According to some embodiments, data repository 180 also includes a profile for at least some message content originators, the profile includes such information as the user's first and last name, his or her telephone number, email address(es), product purchase history, and sentiment scores obtained, for example, at specific times, over periodic intervals, or responsive to a specific event.

In some embodiments, the messages of those users who have a high index of reliability for having contributed favorably rated content (e.g. as confirmed by indicia of positive sentiment of other users) popular) are given high priority with respect to selection of a best response to a to-be-added FAQ topic. Likewise, in some embodiments, depending upon the size of the user topic submitter and/or response submitter candidate pools, a pre-filtering operation may be performed in which certain users—who might otherwise meet the criterion or criteria established in rules database 142 to define a particular message for inclusion in a topical issue cluster—are removed from the candidate pool. Examples of exclusionary criteria may include, by way of illustration, a discernible pre-existing and persistent negative sentiment against an entity, or consistently negative feedback or expressions of sentiment against the submitted by other message contributors.

According to some embodiments, an administrator establishes the selection criterion or criteria for defining each user population to be subjected to preliminary topical issue or response inclusion and/or exclusion analysis. The criterion or criteria is/are stored in a rules database (not shown) and may be employed, by a user population selector (not selected), to identify a pool of users from the community of users whose contributions of product or service inquiries, complaints, or some other query, or responses thereto, are retrieved for storage among the user messages 182 in data repository 180.

Sentiment analyzer 164 is configured to detect changes in sentiment and/or behavior by users of a community toward another message poster based on analysis of posting activity gathered and stored in repository 180. Such reactions to a user's contributions are detected, by processor-executed instructions for natural language analysis of user responses, and also by identifying expressions of favorable or unfavorable sentiment through explicit feedback mechanisms (e.g., "likes" or "dislikes") employed by responding users. Examples of the former operation is described in detail in commonly assigned U.S. patent application Ser. No. 14/452,472 filed on Aug. 5, 2014 and entitled SYSTEMS AND METHODS FOR INFLUENCING CUSTOMER TREATMENT IN A CONTACT CENTER THROUGH DETECTION AND ANALYSIS OF SOCIAL MEDIA ACTIVITY, the disclosure of which is expressly incorporated herein by reference in its entirety.

Each of the user devices 110 is a computing device, for example a desktop computer, laptop, tablet computer, Smartphone, and the like. The user device 110 includes a Central Processing Unit (CPU) 110-3, support circuits 110-1, input/output (I/O) circuits 110-4, network interfaces 110-6, and a memory 110-5. The CPU 110-3 may include one or more commercially available microprocessors or microcontrollers that facilitate data processing and storage. The various support circuits 110-1 facilitate the operation of the CPU 110-3 and include one or more clock circuits, power supplies, cache, input/output circuits, and the like. The memory 110-5 includes at least one of Read Only Memory (ROM), Random Access Memory (RAM), disk drive storage, optical storage, removable storage and/or the like.

The memory 110-5 also includes an operating system (not shown) that provides a computing foundation for software modules of the user device 110. In some embodiments, the memory 110-5 includes one or more social network applications 110-7 and/or commercially available browsers 110-9 which respectively allow the social media servers 115 to receive, authenticate and/or process message activity transactions originated by the users of customer devices 110. In the former case, a user account profile 110-7 is also locally stored within memory 110-5i.

The social media servers 115 is host to a social networking site, for example, FACEBOOK, LINKEDIN, TWITTER, BEHANCE, and the like. Each social media server 115 manages social interactions which include any form of social engagement. In one embodiment, social interactions include a number of likes/dislikes for a company, one of its competitors, or a product or service offered by either. In another embodiment, social interactions include stored comments for a company, competitor or product/service. The comments may include, but need not be limited to, topics relating to the installation, configuration, use and/or maintenance of one or more products by a sponsor of a particular social network page or message feed. In some embodiments, social interactions managed by social media servers 115 include both a number of likes/dislikes for a company, competitor or product/service and stored comments.

A network 10 includes a communication system that connects computers (or devices) comprising the system/server 150, customer devices 110, social media servers 115, contact center 175, routing server(s) 177, and the communication terminals 179 of one or more validating agents. The respective communications between these components may be implemented by wire, cable, fiber optic and/or wireless link(s) facilitated by various types of well-known network elements, such as hubs, switches, routers, and the like. The network 10 may be a part of the Intranet using various communications infrastructure, such as Ethernet, Wi-Fi, a personal area network (PAN), a wireless PAN, Bluetooth, Near field communication, and the like.

Contact center 175 is a conventional contact center such as that offered by Avaya Inc and described in U.S. Pat. No. 6,453,038 issued on Sep. 17, 2002 and entitled SYSTEM FOR INTEGRATING AGENT DATABASE SKILLS IN CALL CENTER ARRANGEMENT, which is expressly incorporated herein by reference in its entirety. In a well known manner, contact center 175 includes one or more queues, and is configured to schedule and establish communication sessions between the respective communication terminal of a contact center agent and a customer or potential customer of an entity. According to some embodiments, system 100 is configured to prompt agents to respond to each of a plurality of inquiries received via social network channels from users of the community of users.

Figure 2:
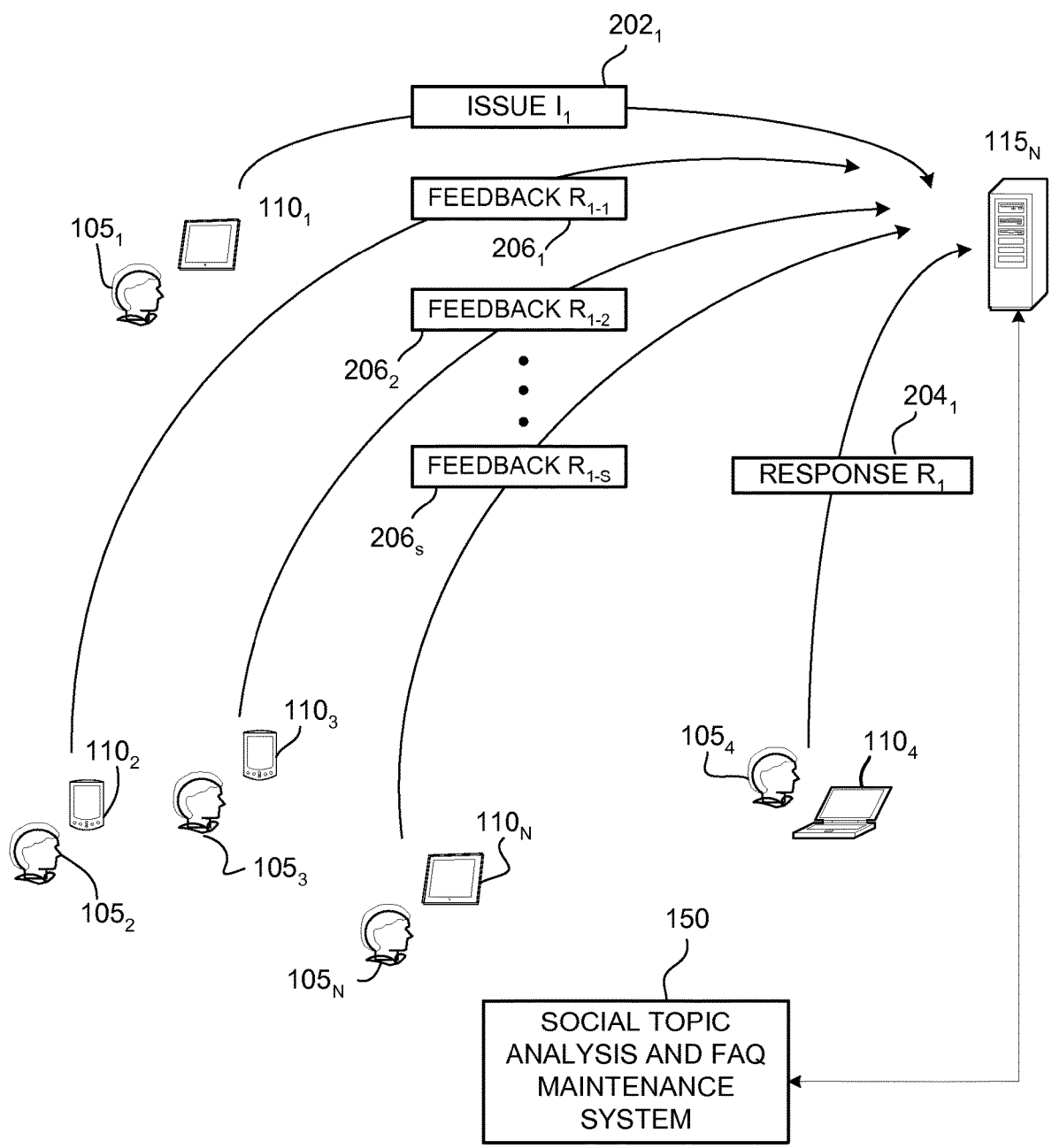
FIG. 2 shows activity on a social media channel being monitored and classified to generate and/or update a FAQ, according to one or more embodiments.

FIG. 2 shows activity on a social media channel hosted by server 115.sub.N, utilizing a protocol such as HTTP (HyperText Transfer Protocol) or SIP (Session Initiation Protocol). In this particular illustrative example, an initial user 105.sub.1 operates communication terminal 110.sub.1 to submit or "post" at least one message relating to a topic (Issue I.sub.1), indicated at reference numeral 202.sub.1, to a social media channel which uses a request-response protocol that is commonly utilized to access websites such, for example, as the ubiquitous HTTP protocol. Other users, as users 105.sub.2, 105.sub.3 and 105.sub.N, use their devices 110.sub.2, 110.sub.3, and 110.sub.N, respectively, to access the same social media channel and review message(s) posted by user 105.sub.1 (as well as by other users belonging to a community of users). In this context, a community of users may comprise any of existing customers of a particular company (e.g. a source of complex, configurable products requiring some degree of expertise when installing, configuring, and/or maintaining them), potential consumers of the company's products, individuals having experience and/or expertise installing, configuring and/or maintaining the company's product(s) and affiliated or not affiliated with the company, or individuals acting on behalf of the company and have access to individuals with the aforementioned expertise.

One or more of the users with expertise or access to expertise, as user 105.sub.4, having expertise relating to the topic posted by user 105.sub.1 may post a response R.sub.1, indicated generally at reference numeral 204.sub.1, to the topic. As noted previously, the user 105.sub.4 may, but need not be, a user affiliated with the sponsor of the media channel. In some embodiments, and in a manner to be described shortly, social topic analysis and FAQ (STAFM) system 150 employs natural language and/or catch phrase analysis techniques to identify and/or classify one or more posted topics as topics 202.sub.1 and any associated responses as response 204.sub.1. In some embodiments, the social media channel enables the one or more other users 105.sub.2, 105.sub.3 and 105.sub.N to express a favorable or unfavorable opinion (e.g., by "like" or "dislike" ratings, emoticons, numeric score, or even by written comments and responses). Such expression is referred to collectively herein as "feedback" and, in FIG. 2, is depicted as 206.sub.1-1 to 106.sub.1-S, respectively.

In some embodiments, some or all of the topics and/or responses are forwarded to a subject matter expert, FAQ administrator, or other company person(nel) for validation and/or revision. Thus, at a high level, the STAFM system 150 is configured to interact with a browser to request, for example, a URL (Uniform Resource Locator) to identify one or more social media channel(s) of interest, then the browser requests messages posted to the social network website 115.sub.N.

Figure 3:
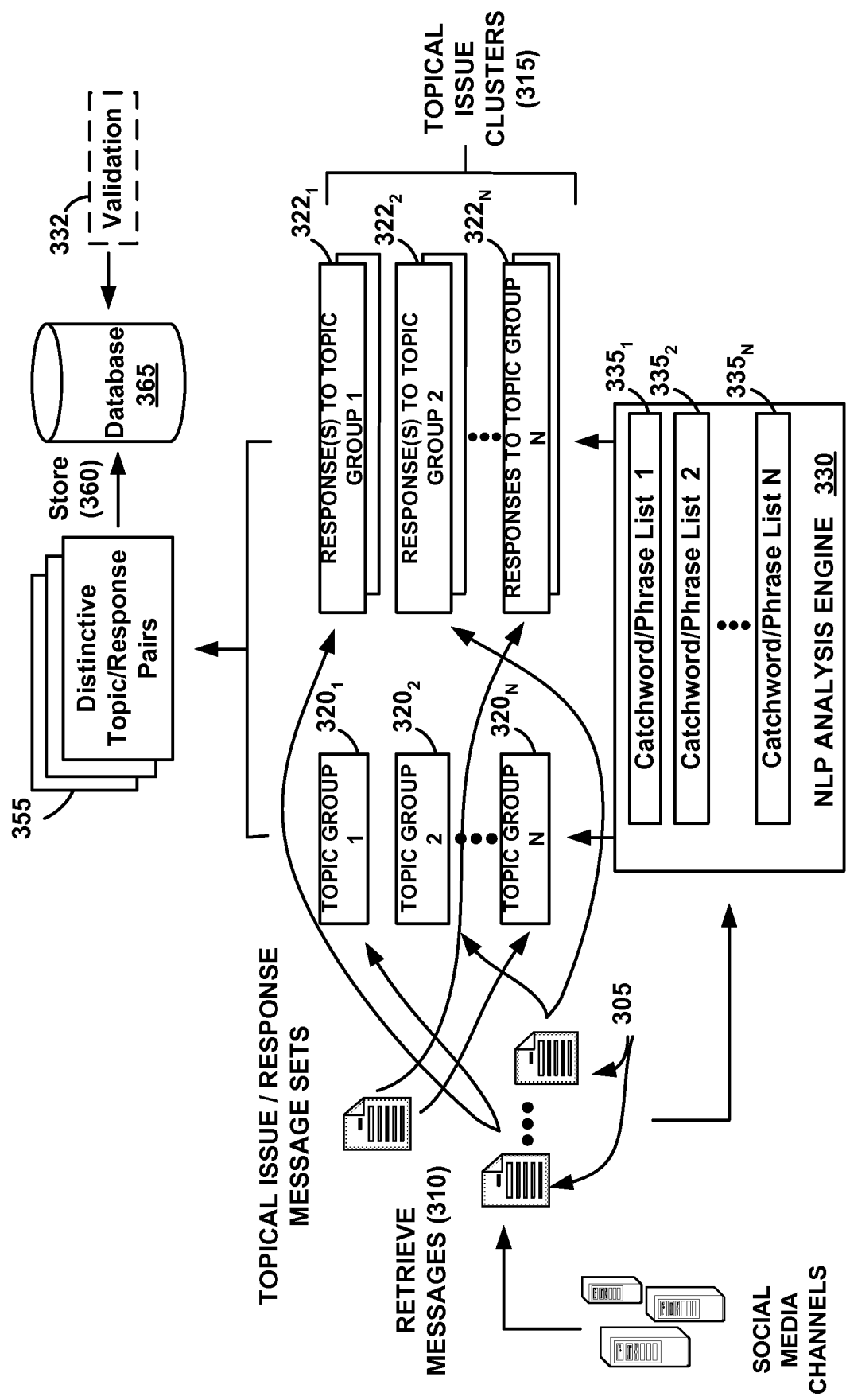
FIG. 3 depicts retrieval of messages from one or more social media channels for automated classification and topical issue clustering, according to an embodiment.

As shown in FIG. 3, in accordance with the present automated classification, messages 305 are retrieved at 310 from the social media channel site(s) 115 for topic classification and relevance assessment. While the criteria used to select the messages for retrieval and analysis admit of substantial variation, in some embodiments all messages are retrieved and stored in a database for subsequent analysis. In other embodiments, however, filtering criteria may be established such as message age (e.g., by application of a rolling time window to exclude those messages which exceed a predetermined age threshold), or relevance to the entity performing the analysis (e.g., by selecting or excluding certain messages based on the inclusion and/or absence of one or more catchwords, combinations of catchwords, or catchphrases. Additional filtering criteria may be based on one or more characteristics of the users accessible from a social media user account profile, or the reliability of a user's prior contributions (i.e., resolution of problems or issued raised by one or more other users).

The stored messages are resolved, by an automated clustering process, into respective topical issue clusters 315. Each topical issue cluster 315 includes a group of one or more messages presenting a topic, as topic message groups 320.sub.1 to 320.sub.N, and groups 322.sub.1 to 322.sub.N of one or more responsive messages resolving. a corresponding issue, problem, or question presented by at least one of the topic message groups. In one or more embodiments, groups of messages 320 and 322 are resolved into respective topic clusters 315 by operation of a natural language processing (NLP) engine 330 which performs cluster analysis. The plurality of topical issues are clustered by partitioning the social media channel messages into homogenous groups based on at least one clustering algorithm from among a partitioning clustering algorithm, hierarchical clustering algorithm, distance-based clustering algorithm and density-based clustering algorithm.

In an embodiment, a distance-based clustering algorithm is employed by identifying distinctive sets of catchwords and catchphrases, or combinations of either or both of these, indicated generally at 335.sub.1 to 335.sub.n. The distinctive topic/response sets (which may be pairs or sets of m topical message groups and n response message groups, where each of m and n are integers equal to or greater than 1). The distinctive topic/response sets 355 are stored at 360 into a database 365. In some embodiments, the topic/response sets may be validated by an agent or other party with access to the contents of database 365.

According to embodiments consistent with the present disclosure, a subset of messages 305 received at 310 are classified according to content into various topical issue clusters 320, and this subset constitutes a training set that functions as an input to an analysis process for generating the list of catchwords and phrases 335.sub.1-N. In some embodiments, the initial classification into topical issue clusters is performed manually by a subject matter expert selected based on the presence of an initial group of one or more catchword(s) and/or catchphrase(s).

Alternatively or in addition, classification and clustering of all messages 305 by NLP analysis engine 330 relies upon a pre-existing taxonomy derived from a stored knowledge base. The knowledge base may, for example, comprise product documentation indexed for use by agents who staff the technical support function of a contact center (FIG. 1B) and respond to customer inquiries about specific products. In this latter example, a body of questions and answers relating to specific products and services already exists but is too granular and/or comprehensive in its pre-existing scope to be of value as a FAQ. In some embodiments, the knowledge base is comprehensive enough to provide a collection of catchphrases and/or catchwords sufficient to enable all, rather than a subset, of the messages into topical issue clusters.

FIGS. 4A to 4C provide graphical representations of catchwords and lists of distinctive catchword/catchword phrases to highlight the definitions of those terms as used herein. FIG. 4A provides a graphical representation of boundaries of a catchword/catchphrase list having Y most referenced words from sample messages in a business issue (e.g. product issue) category, or from a pre-existing taxonomy of questions and answers associated with a knowledge base accessed by contact center agents and/or subject matter experts who provide technical support to customers on a wide range of topics (including but not limited to the smaller set of frequently asked questions to be constructed and/or updated in accordance with the present invention).

The boundary of the extent of catchword list 1 that includes Y most frequently referenced catchwords from the messages 305 (FIG. 3) in a given business topic or business category. The boundary of the extent of catchword list 1 is indicated by reference numeral 405.

FIG. 4B shows how catchword lists may overlap so that membership in a catchword list is not unique. Another catchword list N is shown in FIG. 4B with a boundary indicated by reference number 410. As indicated by reference numeral 415, there is an overlap of catchwords/catchphrases between the two lists. Such overlap can be anticipated given that catchwords are defined to include the most frequently occurring words in sample messages or question/answer pairs from an existing knowledge base.

FIG. 4C provides a graphical representation of boundaries of distinctive catchwords (and/or distinctive catchword combinations and/or phrases) to classify new messages into existing or newly created topical issue clusters. FIG. 4C shows the results of data mining including a first unique set of catchword/phrase combinations 420 that have a high probability of being exclusively in content category 1 and an N.sup.th unique set of distinctive catchword/phrase combinations 425 that have a high probability of being exclusively in content category N.

Figure 5:
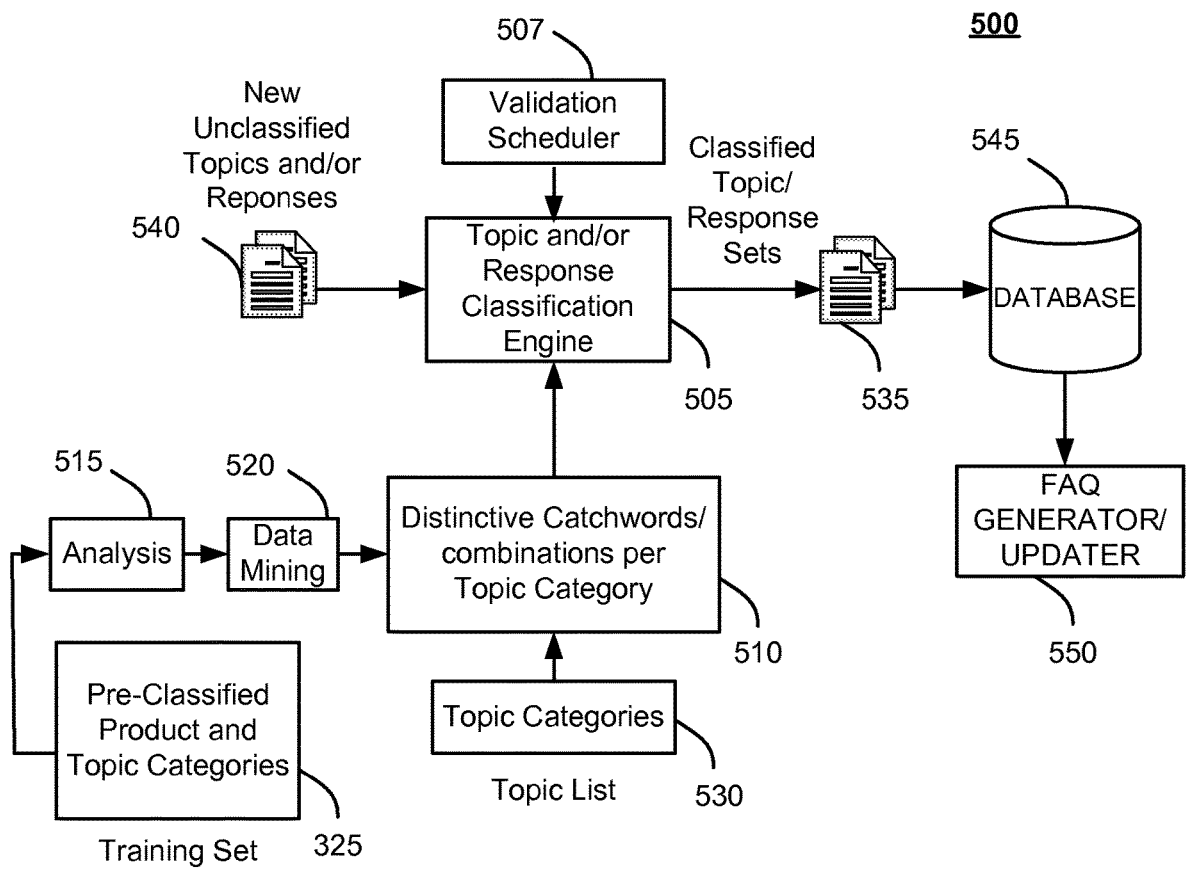
FIG. 5 is a block diagram depicting compilation and dynamic updating of a collection of frequently asked questions (FAQ) based on monitoring of one or more social network channels according to one or more embodiments.

FIG. 5 is a block diagram depicting an illustrative classifier 500 for use in compilation and dynamic updating of a collection of frequently asked questions (FAQ) based on monitoring of one or more social network channels according to one or more embodiments. The classifier 500 includes a classification engine 505 that uses the distinctive catchwords/phrases (or combinations thereof) 510 resulting from analysis 515 of the training set 325 (FIG. 3), or a contact center knowledge base (not shown), and data mining 520 to classify retrieved unclassified messages 540 into topic cluster categories 530. The messages 540 include new, unclassified messages 540 relating, for example, to the identification of topics and/or presentation of resolutions to questions, queries, issues, and/or problems represented by the topics.

The classification engine 505 and other elements of the classifier 500 may form part of the natural language analyzer 162 (FIG. 1B) using all or part of the functionality provided by the social topic monitor 160 (FIG. 1B) or implemented as standalone functionality in some instances. The classified messages may be written to database 545 or transmitted to a remote destination in some cases. Following statistical and other analysis, the most frequently recurring issue/response pairs represented by the classified messages form a newly generated or updated version of a FAQ. The new FAQ is uploaded to a server from which users of a community of users can access it. In some embodiments, the FAQ is transmitted over a communication link for publication to the same social media channels as the source messages upon which the new/updated FAQ is based.

Figure 6:
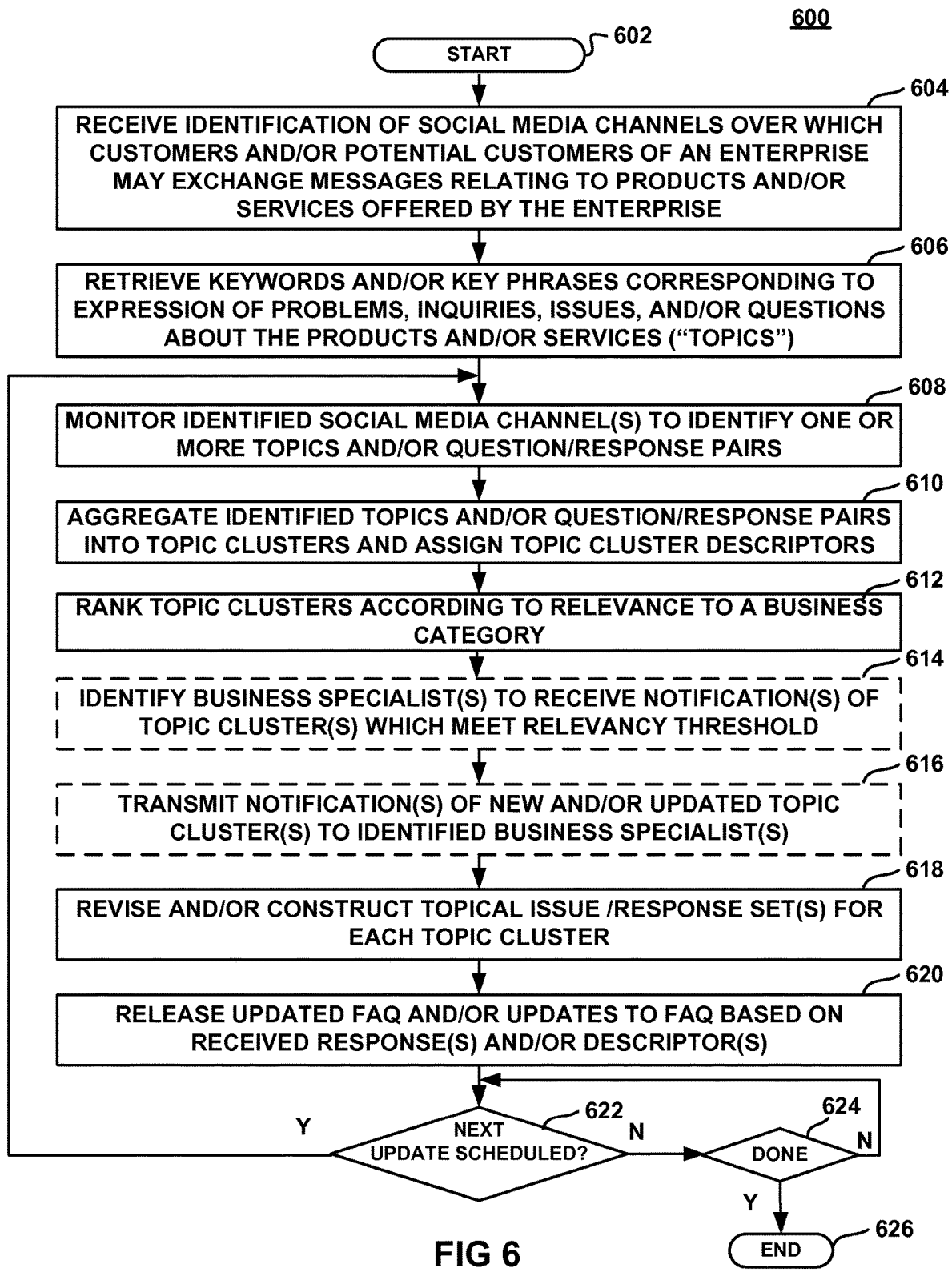
FIG. 6 is a flow diagram depicting the compiling and dynamically updating of a collection of frequently asked questions based on monitoring of one or more social network channels, according to one or more embodiments.

FIG. 6 is a flow diagram depicting a method 600 for compiling and dynamically updating a collection of frequently asked questions based on monitoring of one or more social network channels, according to one or more embodiments.

The method 600 starts at 602 and proceeds to 604. At 604 the method 600 receives an identification of one or more social network channels over which customers and/or potential customers may exchange messages relating to products and/or service offered by a business entity. Typically, the social network channel(s) are sponsored and/or operated by or on behalf of the business entity. In an embodiment, the method 600 proceeds to 606 and retrieves keywords and/or key phrases corresponding to the expression of problems, inquiries, issues, and/or questions about the product(s) or service(s) (collectively, "topics"). In some embodiments, the respective keywords and phrases constitute catchwords and phrases and are derived from a pre-existing collection of questions and answers from a knowledge base accessible to agents of a contact center. The method 600 proceeds to 608.

At 608, method 600 monitors the one or more identified social network channels(s) to identify, for retrieval (e.g. downloading) and storage, messages classifiable into respective topical issue clusters where each cluster comprises at least one topic and at least one resolution of a problem, query, question or other issue identified by the at least one topic. At 610, the retrieved messages are aggregated into topic clusters and are assigned a topical issue descriptor such, for example, a phrasing of a query or question as presented in one of the messages of the topic. The method 600 then ranks the topic clusters according to relevance to business categories as well as a statistical analysis which identifies those topical issues most frequently presented by the community of users accessing the identified social network channels.

In some embodiments, the top N most commonly mentioned topics are selected in the ranking at 612, where N is an integer greater than 1 but less than a selectable upper bound (e.g. an integer between 11 and 20). In addition or alternatively, the upper bound may be a variable determined as fraction of the total number of topics presented via the social media channels. In either case, the ranking and inclusion of topics may be limited to those topics presented within a rolling time interval (e.g. to avoid inclusion of "stale" topics) or it may be unlimited with respect to time.

In some embodiments, the highest ranking topical issue clusters which satisfy an upper boundary threshold are selected as candidates for inclusion in the FAQ subject to validation by one or more subject matter expert(s) or other designated agent(s). In such embodiments, method 600 proceeds to 614 where method 600 identifies the appropriate specialist(s) to receive notifications of the topic clusters meeting the relevancy and frequency thresholds, and thereafter to 616 where notifications of topical issue cluster(s) available for review are transmitted to the designated specialists.

Alternatively, or in addition, the system may forward the topic issue clusters to those users of the community who participated in a discussion of the topic, with a request that these users select a representative statement of the topical issue and a representative resolution of the topical issue. In some embodiments, such an invitation might present the users with a proposed or "default" formulation of the issue statement and response based on positive and/or negative feedback already submitted by these and other users. For example, if the topic cluster includes three messages which identify the same issue (e.g., configuring a particular model of router to block an inbound or outbound IP address), and four other users responded by describing how to resolve the issue, then the response having the highest positive measure of feedback is selected as the response.

The method 600 proceeds to 618, where the method 600 constructs and/or revises, for each topical issue cluster meeting the ranking criteria at 612, a topic issue/response pair. At 620, the respective topic/issue pairs which comprise the new or updated FAQ are uploaded (via transmission over a communication link) to the identified social media channel(s) where they can be reviewed and accessed by subsequent users. In some embodiments, the FAQ is continuously updated and, in other embodiments, a regular update schedule is specified. In embodiments of the latter type, if it is determined at 622 that a next update is currently scheduled, the method 600 returns to 608 and resumes monitoring of the social media channel and subsequent steps as described above. If not, then the method 600 proceeds to 624 where method 600 determines whether the process should be terminated. If so, the method proceeds to 626 and terminates. If not, the method returns to 622 until the next update is schedule.

The embodiments of the present invention may be embodied as methods, apparatus, electronic devices, and/or computer program products. Accordingly, the embodiments of the present invention may be embodied in hardware and/or in software (including firmware, resident software, microcode, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java.RTM., Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

What is claimed is:

1. A computer implemented method comprising:
receiving a selection of social media channels, wherein each of the social media channels includes a plurality of messages originated by a community of users and stored on a server, and wherein the plurality of messages being accessible via a communication network;
retrieving at least some of the plurality of messages from the social media channels via the communication network, wherein each of the retrieved messages has at least one catchword or at least one catchphrase associated with a topic of a plurality of topics;
analyzing the retrieved messages to form a plurality of topical issue clusters;
at least one of generating or updating a frequently asked questions (FAQ) collection, including selecting, for inclusion in the FAQ collection, a first subset of responses, in a topical issue cluster of the topical issue clusters, to an issue identified by at least one user of the community of users based on feedback expressing user sentiment of the at least one user submitted via the social media channels; and
transmitting the generated or updated FAQ collection to a storage location accessible to the community of users.

2. The method of claim 1, wherein each topical issue cluster is associated with at least one topic of the plurality of topics.

3. The method of claim 1, wherein each topic of the plurality of topics relates to at least one of use, installation or maintenance of a product or service.

4. The method of claim 1, wherein each topical issue cluster includes at least one issue identified by the community of users and at least one resolution of the issue identified by the community of users.

5. The method of claim 1, wherein the at least one of generating or updating the FAQ collection includes performing statistical analysis to select a subset of topical issues identified by the community of users at a higher frequency than other topical issues identified by the community of users.

6. The method of claim 5, wherein the subset is selected based on one of a percentage or a numerical threshold.

7. The method of claim 1, further comprising retrieving the at least one catchword or the at least one catchphrase associated with the topic of the plurality of topics.

8. The method of claim 1, wherein the at least one of generating or updating the FAQ collection further includes selecting a second subset of responses for exclusion from the FAQ collection according to the feedback.

9. The method of claim 1, wherein the at least one of generating or updating the FAQ collection includes transmitting an alert to at least one validating agent for at least one of approval or editing of the first subset of responses.

10. The method of claim 1, wherein the at least one of generating or updating the FAQ collection includes transmitting an alert to at least one validating agent to initiate review of at least one of the topical issue clusters.

11. The method of claim 1, wherein the at least one of generating or updating the FAQ collection includes transmitting an alert to at least one member of the community of users to initiate at least one of review or editing of a question component, a response component, or both the question component and the response component of at least one of the topical issue clusters.

12. The method of claim 11, further including selecting, as at least one user to review a topical issue cluster, a user who identified an issue applicable to the topic issue cluster.

13. The method of claim 11, further including selecting, as at least one user to review a topical issue cluster, a user who identified a resolution applicable to the topical issue cluster.

14. The method of claim 1, wherein the analyzing of the retrieved messages to form of the plurality of topical issue clusters comprises partitioning social media channel messages into homogenous groups based on at least one clustering algorithm from among a partitioning clustering algorithm, hierarchical clustering algorithm, distance-based clustering algorithm and density-based clustering algorithm.

15. An apparatus comprising:
   at least one hardware processor; and
   a memory having stored therein machine executable instructions, that when executed by the at least one processor, cause the apparatus to:
      receive a selection of social media channels, wherein each of the social media channels includes a plurality of messages originated by a community of users and stored on a server, and wherein the plurality of messages being accessible via a communication network;
      retrieve at least some of the plurality of messages from the social media channels via the communication network, wherein each of the retrieved messages has at least one catchword or at least one catchphrase associated with a topic of a plurality of topics;
      analyze the retrieved messages to form a plurality of topical issue clusters;
      at least one of generate or update a frequently asked questions (FAQ) collection, including selecting, for inclusion in the FAQ collection, a first subset of responses, in a topical issue cluster of the topical issue clusters, to an issue identified by at least one user of the community of users based on feedback expressing user sentiment of the at least one user submitted via the social media channels; and
      transmit the generated or updated FAQ collection to a storage location accessible to the community of users.

16. The apparatus of claim 15, wherein each topical issue cluster is associated with at least one topic of the plurality of topics.

17. The apparatus of claim 15, wherein each topical issue cluster includes at least one issue identified by the community of users and at least one resolution of the issue identified by the community of users.

18. The apparatus of claim 15, wherein the instructions are executable by the at least one processor to select a second subset of responses for exclusion from the FAQ collection according to the feedback.

19. The apparatus of claim 15, wherein the instructions are executable by the at least one processor to transmit an alert to at least one of a validating agent or a member of the community of users to initiate review of at least one of the topical issue clusters.

20. The apparatus of claim 19, wherein the instructions are executable by the at least one processor to select, for initiating review of the at least one topical issue cluster, a user who identified an issue applicable to the at least one topic issue cluster or who identified a resolution applicable to the at least one topical issue cluster.

* * * * *